United States Patent [19]

Benz et al.

[11] Patent Number: 4,779,724
[45] Date of Patent: Oct. 25, 1988

[54] SUPPORT STRUCTURE FOR ANNULAR MAGNETIC RECORDING DISKS

[76] Inventors: William G. Benz, 1945 Piner Rd., #133, Santa Rosa, Calif. 95401; Vern E. Goode, 6645 Mt. Forest Dr., San Jose, Calif. 95120; Donald Ivie, 2040 Diane Ave., Morgan Hill, Calif. 95037

[21] Appl. No.: 29,082

[22] Filed: Mar. 23, 1987

[51] Int. Cl.⁴ .............................................. B65D 85/02
[52] U.S. Cl. .................................... 206/303; 206/334; 206/454; 206/444
[58] Field of Search ............... 206/303, 328, 334, 449, 206/453, 454, 455, 444, 445; 360/133; 369/291

[56] References Cited

U.S. PATENT DOCUMENTS

| | | | |
|---|---|---|---|
| 4,228,902 | 10/1980 | Schulte | 206/454 |
| 4,520,925 | 6/1985 | Johnson | 206/454 |
| 4,555,024 | 11/1985 | Voss et al. | 206/454 |
| 4,557,382 | 12/1985 | Johnson | 206/454 |
| 4,574,950 | 3/1986 | Koe et al. | 206/454 |
| 4,588,086 | 5/1986 | Coe | 206/454 |
| 4,669,612 | 6/1987 | Mortensen | 206/454 |
| 4,679,689 | 7/1987 | Blome | 206/453 |
| 4,684,021 | 8/1987 | Niebung et al. | 206/453 |
| 4,687,097 | 8/1987 | Mortensen | 206/454 |

*Primary Examiner*—Joseph Man-Fu Moy
*Attorney, Agent, or Firm*—John J. Leavitt

[57] ABSTRACT

Presented is a support structure for annular magnetic recording disks of the "hard" type used in computers. These types of disks are not usually manufactured by the same manufacturer that manufactures the disk drive mechanism. In many instances the disk drive manufacturer is far removed from the disk manufacturer and as a consequence the disks must be shipped to the disk manufacturer for installation in the disk drives prior to incorporation in the completed computer. The disks are highly susceptible to contamination from a variety of sources, and must therefore be handled with extreme care to avoid such contamination. The support structure of this invention constitutes an expandable and contractible mandrel designed specifically to interact with the inner periphery of the annular magnetic disks in such a manner as to support a multiplicity of the disks in spaced parallel relation. In addition to the mandrel, there is also presented two different types of containers for storing and/or shipping a multiplicity of disks while they are being supported in spaced non-contiguous relation by the mandrel within the container. The container and mandrel cooperate to prevent the disks from coming in physical contact with the interior of the container. In one of the containers, the base of the container constitutes an auxiliary holding device for retaining the disks in spaced parallelism when the mandrel is removed from the assembly of disks.

41 Claims, 4 Drawing Sheets

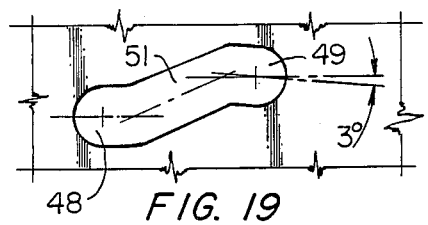
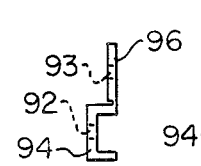
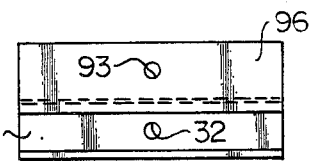
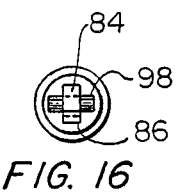
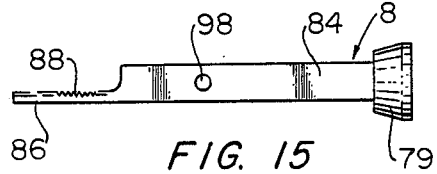
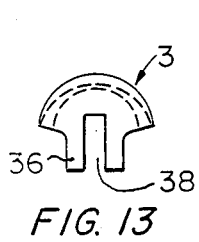
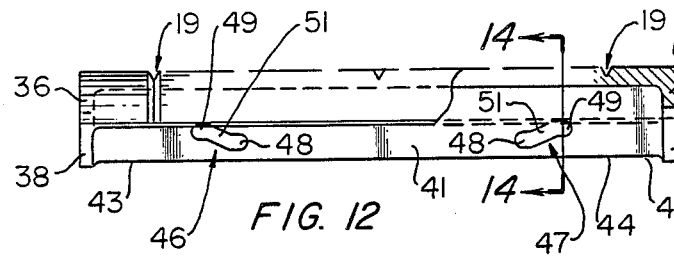
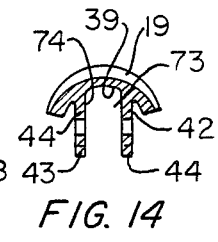
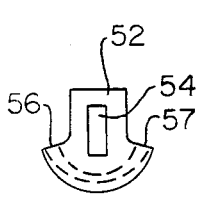
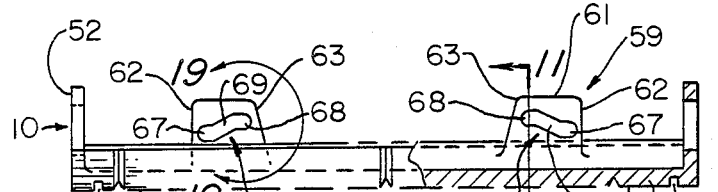
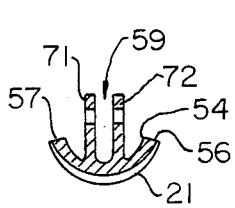
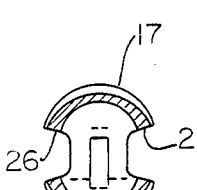
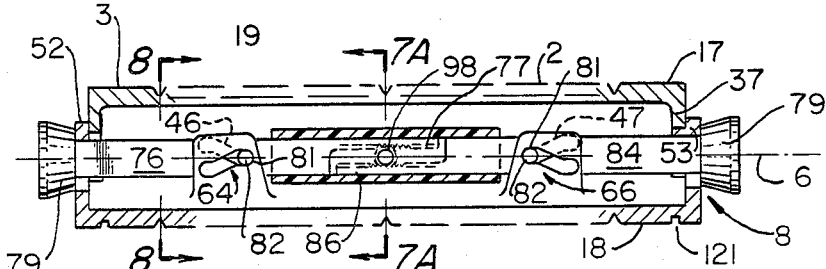
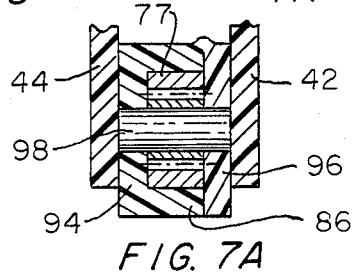

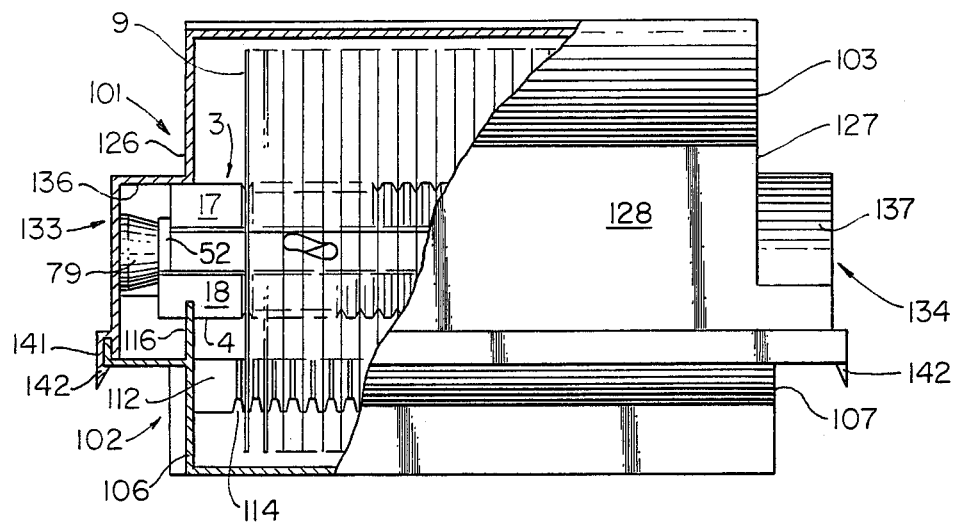
FIG. 20
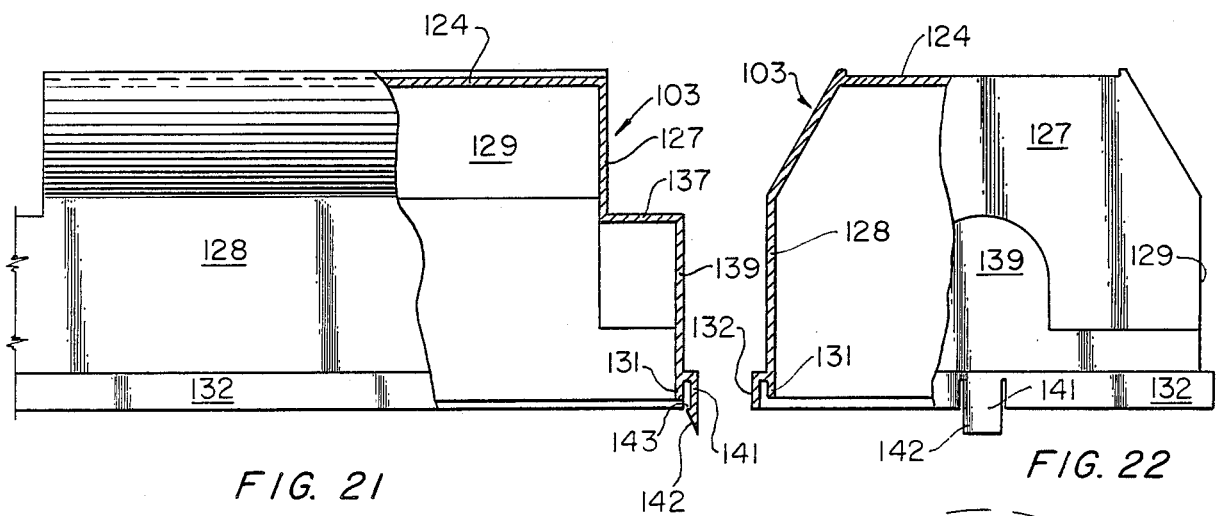
FIG. 21
FIG. 22
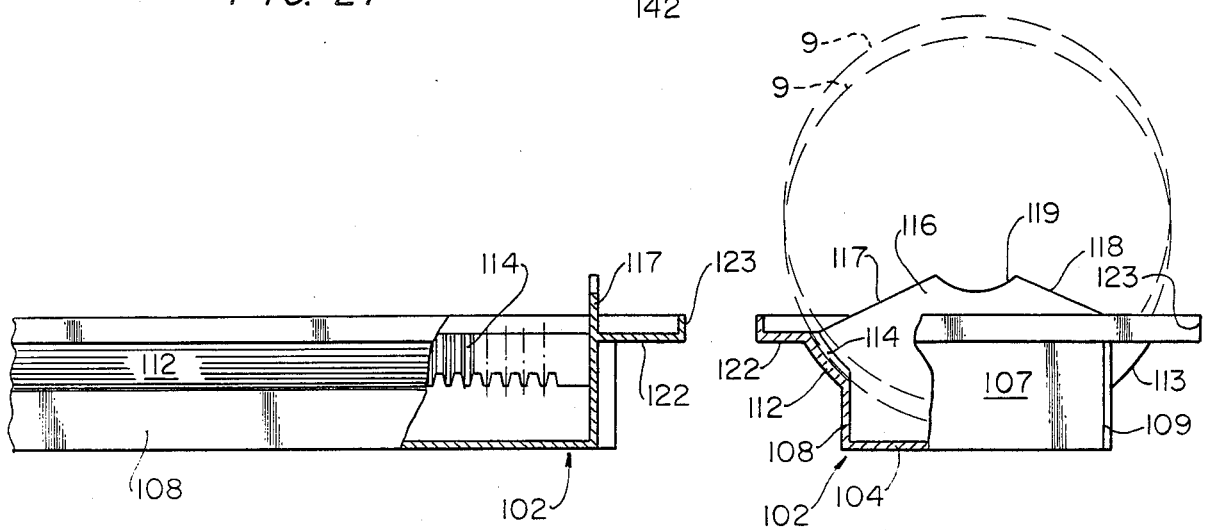
FIG. 23
FIG. 24

SUPPORT STRUCTURE FOR ANNULAR MAGNETIC RECORDING DISKS

BACKGROUND OF THE INVENTION

1. Field of the Invention

This invention relates to a support structure for annular magnetic recording disks, and particularly to a mandrel type support structure that cooperates with the interior periphery of the disks to retain them in spaced parallelism for purposes of processing, handling, shipping, receiving and storing.

2. Description of the Prior Art

The prior art relating to the mandrel aspect of this invention is believed to reside in Class 206, sub-classes 303, 309, 310, 334, 397, 444, 445, 454, 564 and 54; and in Class 279, sub-class 2R. A preliminary patentability search conducted in this area has indicated the existence of the following U.S. patents:

| | | |
|---|---|---|
| 2,682,924 | 2,690,914 | 2,699,338 |
| 3,085,763 | 3,456,897 | 3,926,305 |
| 3,961,877 | 4,043,451 | 4,450,960 |
| 4,471,716 | 4,520,925 | 4,557,382 |
| | 4,588,086 | |

It is noted that five of the patents listed are directed specifically to mandrels per se, but none of these five patents relate to a mandrel construction that is applicable to support annular magnetic recording disks. Additionally, none of the mandrels taught by these five patents are of similar construction to the mandrel forming the subject matter of this invention. The shipping containers for semiconductor wafers, and none of them disclose a combination of structure functioning to support a multiplicty of annular magnetic recording disks in spaced parallelism within a container so that the disks do not touch the container.

U.S. Pat. No. 4,502,598, while not listed above, is the only patent known which utilizes a support structure passing through the central aperture of the magnetic disks to support the disks, but the support structure taught by this patent is completely different in its structure and mode of operation and function from the support structure forming the subject matter of this invention.

Because of the millions of "hard" disks that are being demanded by the computer using public, it is imperative that manufacturers develop new techniques and equipment for handling disks in multiple amounts rather than one at a time as has heretofore been the case. Just in the processing procedures for manufacturing disks, there is a need for a tool that will securely hold a multiple number of disks while chemical and/or mechanical processes are carried out. Such a tool must interact with each disk in such a manner as to give access to both sides of each disk yet hold it immobile while the processes are being performed. Preferably, the tool interacts with multiple disks in such a manner as to give access to all of the disks supported on the tool so that all of the disks can be subjected to the manufacturing processes simultaneously, thus increasing production and reducing cost of manufacture and the ultimate cost to the consumer.

Accordingly, it is one of the important objects of the invention to provide a mandrel-type support structure for a multiplicity of annular magnetic recording disks which will support the disks in spaced parallelism along a common axis so as to enable multiple manufacturing functions and processes to be performed simultaneously on the disks while so held.

Some of the processes used in the manufacture of "hard" magnetic recording disks require that differet materials be used for the support structure in the different processes. For instance, if the process calls for an acid bath for etching purposes, synthetic resinous material is highly resistant to the action of the acid, and thus for such a process it is expedient that the support structure be fabricated from such acid resistant material. On the other hand, if the same group of disks is then required to be baked at elevated temperatures to eliminate stress in the disks, or for whatever reason, it is clear that most synthetic resinous materials cannot be exposed to such high temperatures, which in some instances may be as high as 600 to 700 degrees F. In such situations, it is most advantageous if the same group of disks which were initially supported on a support structure fabricated from a synthetic resinous material could now be transferred to essentially the same type of support structure, but fabricated from a material that can withstand the high temperatures of a bake procedure. Accordingly, is another object of the invention to provide a mandrel-type support structure that may be fabricated from different materials to accommodate different process environments while still fixedly supporting the multiple number of disks in spaced parallelism along a common axis.

After the many manufacturing processes have been completed, one of the last steps is to scrupulously clean the magnetic medium covering the sides of the disk so that the magnetic medium is perfectly clean and smooth, with no bits of dust or other contamination on the surface that would cause an irregularity that might come in contact with the "read" or "write" head of the computer when in use. It is therefore very critical that the disk, or preferably multiples of them, be handled in such a way that such contamination or damage will not occur between the time that the manufacturing processes have been completed and the interval during which the completed disk must be stored prior to shipment to a disk manufacturer. Accordingly, still another object of the invention is the provision of a support structure which will support the super clean disks in spaced parallel relation in a non-contaminating manner, and which cooperates with a container to enclose and support the multiple disks within the container in such manner that the disks do not come in contact with the container but are suspended in space within the container by the cooperative relationship of the support structure and the container.

In some instances during the manufacturing processes of the disks, it is necessary to first retain the multiple disks on a support structure which contacts only the inner peripheries of the disks while processes are being performed, and to then release the multiple disks from the mandrel-type support structure while retaining them in spaced axially aligned relationship along a common axis. This necessity might arise, for instance, when a mandrel-type support structure of different material is required for the succeeding process, requiring the first mandrel, say of plastic, to be removed, and the second mandrel, say of steel, to be applied to the batch of disks. Accordingly, a still further object of the invention is the provision of a mandrel-type support structure cooperating with a container base having means formed therein adapted to receive, support and retain the multiple disks in the same orientation and spacing as when supported on the mandrel when the mandrel is manipulated to release the multiple disks.

The shipment of such sensitive to contamination and damage items as "hard" magnetic recording disks raises a plethora of problems, not the least of which are the effect of temperature cycling, variations in pressure, exposure to moisture, exposure to dust, exposure to in-transit impacts, and even wear and release of contaminants resulting from relative movement of the disks in relation to the support structure, or in relation to each other, over extended periods of storage or shipment. It is therefore yet another object of the invention to provide a mandrel-type support structure for multiple spaced axially aligned magnetic recording disks which cooperates with a novel shipping or storage container that seals the multiple disks within a cavity that is sealed from the outside atmosphere and wherein the disks are retained in elevated or suspended non-contiguous relationship with the container at all times that the container is closed.

Because the "traffic" in disks is so extensive, and because only a limited number may be shipped in a single container, it is advantageous to provide a container for shipment purposes that will cooperate with the mandrel-type support structure, but which is sufficiently inexpensive to permit discarding of the container, instead of shipping empty containers back to their source. Accordingly, a still further object of the invention is the provision of a mandrel-type support structure for "hard" magnetic recording disks which cooperates with a throw-away container to enclose and support a multiple number of disks in spaced relation within the container yet out of contact with the container so as to eliminate the possibility of contamination or damage to the disks during transit.

Because of the impact shocks imposed on goods, particularly shipments that are made by rail, it sometimes occurs that the goods are caused to shift their positions within the container in which they are shipped, thus causing damage when the goods impact against each other and against the container walls. It is therefore another object of the invention to provide a mandrel-type support structure cooperating with the container in such a manner that the container prevents the mandrel-type support structure from being inadvertently manipulated to release the multiple disks it supports in space within the container.

Yet another object of the invention is the provision of a mandrel-type support structure which in its contracted state or condition easily passes through the central aperture of the axially aligned magnetic disks, thus permitting relative movement between the disks and the mandrel-type support structure, while in its expanded state or condition the mandrel-type support structure engages the inner peripheral edge portions of the disks so as to retain them in spaced axial alignment along a common axis, and which when fully expanded locks in expanded condition to preclude the possibility of inadvertent or accidental collapse of the mandrel with resultant release of the disks.

A still further object of the invention is the provision of a mandrel-type support structure in which two opposing elongated members are arranged to be manipulable in a direction transverse to the longitudinal dimension of the members so as to increase or decrease the diametric dimension of the opposed members so as to engage or release multiple spaced magnetic "hard" disks by their inner peripheries.

Another object of the invention is the provision of a mandrel-type supporting structure for a multiplicity of "hard" disks, in which two elongated diametrically opposed disk engaging members are caused to be displaced diametrically toward or away from each other in relation to a longitudinal axis by the same amount and at the same rate.

Still another object of the invention is the provision of a mandrel-type support structure for a multiplicity of annular disks in which two elongated diametrically opposed and transversely spaced support surfaces are provided on opposite sides of an elongated central axis, and cam means are provided operatively interposed between the two elongated support surfaces and manipulable to effect diametric displacement of the elongated support surfaces toward or away from each other in relation to the central axis whereby when said support surfaces are at their greatest diametric dimension the support surfaces engage the inner peripheries of the multiple disks and when the support surfaces are at their minimum diametric dimension the support surfaces release the inner peripheries of the multiple disks.

Another object of the invention is the provision of a mandrel-type support structure possessing two diametrically opposed support surfaces spaced on opposite sides of an elongated central axis and having a pair of elongated axially aligned cam actuator members disposed between the two support surfaces whereby when said cam actuator members are displaced axially toward one another the support surfaces are moved diametrically farther apart, whereas when the cam actuator members are displaced axially away from each other the support surfaces are caused to move diametrically toward each other.

Yet another object of the invention is the provision of a mandrel-type support structure for a multiplicty of annular disks, in which the support structure includes two arcuate disk support members spaced diametrically apart on opposite sides of a central axis, the two arcuate disk support members cooperating with two axially aligned cam actuator members disposed therebetween and adapted to be displaced axially toward or away from each other to effect an opposite diametric displacement of the arcuate support members, and in which the two cam actuator members are interengaged in a manner to insure that each is displaced at the same rate as the other cam actuator member but in the opposite direction.

The invention possesses other objects and features of advantage, some of which, with the foregoing, will be apparent from the following description and the drawings. It is to be understood however that the invention is not limited to the embodiment illustrated and described since it may be embodied in various forms within the appended claims.

SUMMARY OF THE INVENTION

In terms of broad inclusion, the support structure of the invention for use in supporting annular disks in axial alignment and in spaced parallel relation, in one aspect, comprises two elongated diametrically opposed arcuate support members spaced on opposite sides of a central elongated axis and arranged to coact with two axially aligned cam actuator members axially disposed between the two arcuate support members whereby axial displacement of the two axially aligned cam actuator members toward each other effects transverse diametric displacement of the arcuate support members away from each other and away from the central axis at the same rate and by the same amount, while axial displacement of the two axially aligned cam actuator members away from each other effects transverse diametric displacement of the arcuate support members toward each other and toward the central axis at the same rate and by the same amount. Means are provided associated with the cam actuator members to lock the arcuate support members at the extremes of their transverse displacement in either an expanded condition or in a contracted condition.

In another aspect of the invention, the mandrel-type support structure is designed to cooperate with a housing or container to enclose the mandrel, now loaded with disks, within a cavity formed within the housing in such manner that the disks are held suspended in non-contacting relation with the housing, the mandrel being supported at opposite ends on the housing and being locked in this position to preclude the possibility of inadvertent contraction of the mandrel with consequent release of the disks. In this aspect of the invention, in one embodiment of the housing, means are provided for receiving, supporting and retaining the disks in spaced parallelism free of the mandrel and supported by their outer peripheries on the housing interior.

BRIEF DESCRIPTION OF THE DRAWINGS

FIG. 7 is a longitudinal cross-sectional view through the mandrel and showing the cam actuating members in relation to the arcuate support members in expanded condition in which they would engage the inner peripheries of multiple disks if mounted on the mandrel.

FIG. 7A is a fragmentary enlarged cross-sectonal view taken in the plane indicated by the line 7A—7A in FIG. 7, and showing the pinion journal support sleeve wrapped around the overlapped portions of the cam actuating members.

FIG. 8 is a cross-sectional view taken in the plane indicated by the line 8—8 in FIG. 7.

FIG. 9 is a fragmentary elevational view of one of the elongated arcuate support members shown apart from the remaining structure. A portion is broken away for clarity of illustration.

FIG. 10 is and end elevational view of the elongated arcuate support member of FIG. 9 taken in the direction of the arrow 10 in FIG. 9.

FIG. 11 is a cross-sectional view taken in the plane indicated by the line 11—11 in FIG. 9.

FIG. 12 is a fragmentary elevational view similar to FIG. 9 but showing the opposite elongated arcuate support member apart from any other structure. A portion of the structure is broken away for clarity of illustration.

FIG. 13 is an end elevational view of the elongated arcuate support member shown in FIG. 12, the view taken in the direction of the arrow 13 in FIG. 12.

FIG. 14 is a cross-sectional view taken in the plane of the line 14—14 in FIG. 12.

FIG. 15 is a fragmentary elevational view showing the structure of one of the elongated cam actuating members.

FIG. 16 is an end elevational view of the cam actuating member of FIG. 15 taken in the direction of the arrow 16.

FIG. 17 is an elevational view of the pinion journal support sleeve shown prior to assembly and apart from the overlapping ends of the cam actuating members which it surrounds when assembled in the support structure.

FIG. 18 is an end elevational view of the pinion journal support sleeve of FIG. 17, shown prior to assembly and apart from other structure.

FIG. 19 is an enlarged fragmentary elevational view of one of the cam slots formed in one of the arcuate support members, taken from the area indicated by the line 19—19 shown in FIG. 9.

FIG. 20 is an elevational view partly in section of a complete assembly of the disk support mandrel, a multiplicity of disks supported thereon, and the housing enclosing the mandrel and disk assembly, showing the multiplicity of disks suspended out of contact with the enclosing housing.

FIG. 21 is a fragmentary side elevational view of the cover portion of the housing apart from the base portion, portions of the housing cover being broken away to reveal the internal construction of the cover.

FIG. 22 is a fragmentary end elevational view of the cover portion of the housing, a portion of the end wall broken away to reveal the interior of the housing cover portion.

FIG. 23 is a fragmentary side elevational view of the base portion of the housing, a portion of the side wall broken away to reveal the internal construction.

FIG. 24 is an end elevational view of the base portion of the housing, a portion of the end wall being broken away to reveal the internal construction. The position of a disk supported on the base after removal of the mandrel is shown in broken lines, while the position of a disk supported on the mandrel which is in turn supported on the base is shown in dash lines.

DESCRIPTION OF THE PREFERRED EMBODIMENTS

Figure 1:
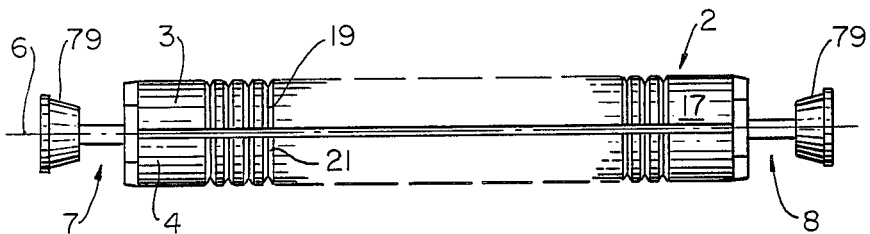
FIG. 1 is a plan view of the mandrel support structure of the invention shown with its arcutate disk support members contracted to their mimimum diametric spacing.

In terms of greater detail, the invention disclosed herein has been made to satisfy a long-felt need in the computer manufacturing industry and in other related and non-related industries for a tool for fixedly supporting a multiplicity of separate annular disks in axially aligned equally spaced parallel relationship. Such a tool, or support structure, is preferably simple in its construction, readily and economically manufactured by mass production assembly line techniques and equipment, susceptible of being manufactured in various sizes without significantly modifying its structure and mode of operation, and capable also of being fabricated from various materials that have particular affinity for the environments in which the tool or support structure is intended to be used.

Additionally, because the disks supported on the support structure are frequently subjected to numerous manufacturing, cleaning, coating and polishing procedures on their lateral annular sides while being held on and by the support structure, it is important that the disks be supported on and by the support structure only by their inner peripheries, thus giving access to the annular sides of the disks while held on the support structure.

Specifically with respect to so-called "hard" magnetic recording disks for inclusion as the recording medium in computers, it is extremely important that the annular sides of the disks be protected against contamination such as by contact with the fingers, dust particles, smoke particles or moisture of any kind, and that groups or batches of a multiplicity of disks be handled simultaneously to increase productivity while minimizing the opportunities for contamination of the disks.

As indicated above, "hard" magnetic recording disks must frequently be shipped long distances from the manufacturer of the disk to the manufacturer of the disk drive. This shipment interval in particular provides the opportunity for contamination of the "hard" magnetic recording disks from all of the sources indicated above, but also from wear that occurs between the disks and the conventional support structures heretofore used in this industry, and migration of the particles generated by such wear to the recording surfaces of the disks. For instance, in the only such structure which has been found to use a support structure that penetrates through the aperture in such "hard" disks, namely, the structure illustrated in U.S. Pat. No. 4,502,589, the disks are individually placed about a fixed pedestal that extends through the central aperture of the disk. To separate successive disks stacked one upon another, there is inserted over each successive disk a small annular spacer that engages an annular band of the sides of each associated disk next adjacent the central aperture. The pedestal projects from a base to which it is fixed, and a cover is provided to enclose the vertically stacked "hard" disks, each of which is contiguous on both sides with one of the annular spacers. This type of contact between the sides of the disk and the spacers, as a result of relative movement between the disks and the spacers, subjects the sides of the disks and the spacers to wear of the type likely to generate contaminating particles which it is desireable to avoid. That is one of the reasons why with respect to the instant invention it is important that the support structure contact only the inner peripheries of the disks.

Figure 25:
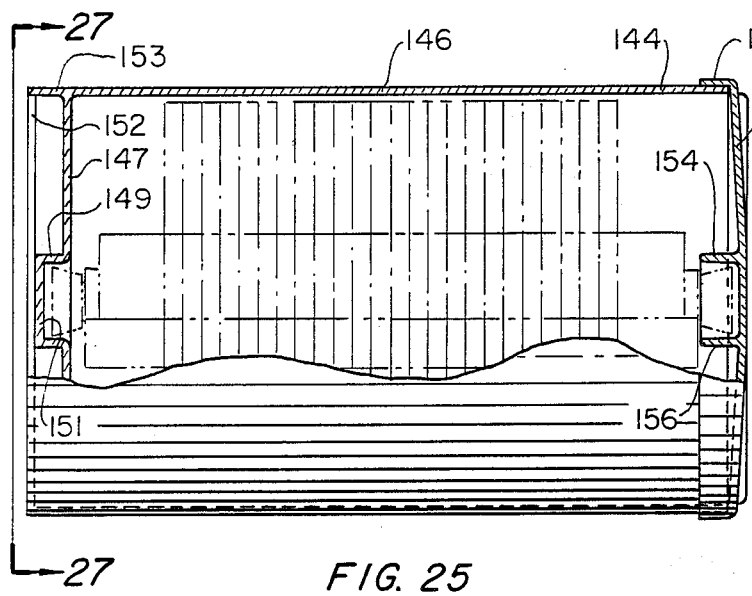
FIG. 25 is a side elevational view of a different housing embodiment, showing the interrelationship of the mandrel with the housing covers to support the multiplicity of disks in spaced suspension within the cavity formed by the housing but out of contact with the interior of the housing. A portion of the housing wall is broken away to reveal the interior of the housing.
Figure 26:
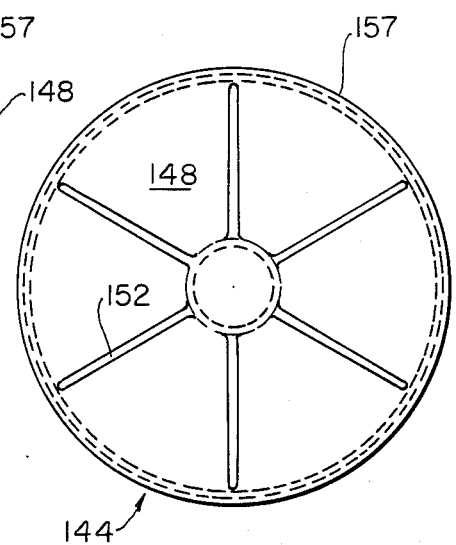
FIG. 26 is an end elevational view of the housing of FIG. 25.
Figure 27:
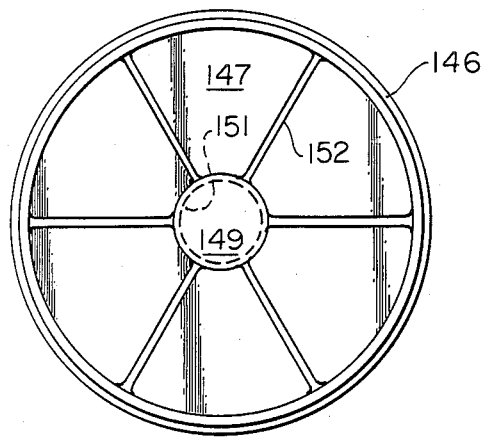
FIG. 27 is an end elevational view of the housing of FIG. 25 taken in the direction of the arrows 27 in FIG. 25.

Referring to the drawings, FIGS. 1 through 7 illustrate the mandrel-type support structure of the invention in assembled form, in contracted and expanded condition, and in relation to a multiplicity of "hard" disks supported thereof. FIGS. 8 through 19 illustrate details of construction of the mandrel-type support structure, while FIGS. 20 through 24 illustrate the assembly of the mandrel-type support structure with one type of housing, and FIGS. 25 through 27 illustrate the assembled mandrel-type support structure with another type of housing.

Referring to FIGS. 1 through 7, the mandrel-type support structure of the invention is designated generally by the numeral 2, and includes a first elongated disk-support member 3, a second elongated disk-support member 4 spaced from and opposing the first elongated member on the opposite side of a central axis 6. Operatively disposed between the two elongated disk-support members are cam-actuating thrust members designated generally by the numerals 7 and 8, and which are axially aligned and manipulable to effect controlled displacement of the two elongated disk-support members transversely of the central axis to thus selectively expand or contract the mandrel-type support structure between maximum and minimum limits correlated to the diameter of the aperture in the disks to be supported.

For instance, a "hard" magnetic recording disk manufactured by one disk manufacturer has an aperture having an inner peripheral diameter of about 1.5625", an outer peripheral diameter of about 5.1250" and a side-to-side thickness of about 0.0625. Thus, the contracted diameter of the disk support structure for such a disk should be sufficiently less than the inner peripheral diameter to permit convenient insertion of the mandrel-type support structure through the aperture without great difficulty.

In like manner, the expanded diameter of the mandrel-type support structure must be at least 1.5625 in the area adapted to contact the disks inner peripheries, and preferably should be capable of expansion to a diameter slightly larger than that dimension for reasons which will appear hereinafter.

Figure 2:
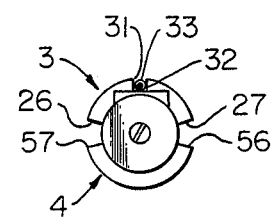
FIG. 2 is an end elevational view of the mandrel taken in the direction of the arrow 2 in FIG. 1.
Figure 5:
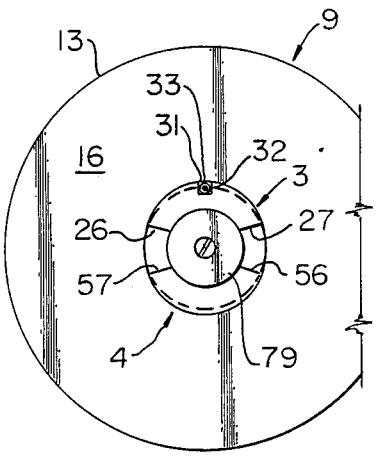
FIG. 5 is an end elevational view of the expanded mandrel-disk assembly illustrated in FIG. 4. A portion of the peripheries of the disks are broken away to reduce the size of the view.
Figure 6A:
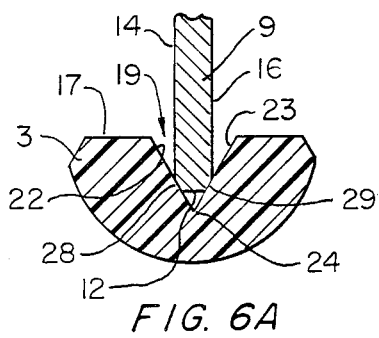
FIG. 6A is a fragmentary enlarged sectional view showing the relationship of the inner periphery of one of the disks with the arcuate support member on which is is supported but excluding the means for introducing resilience into the union.
Figure 6:
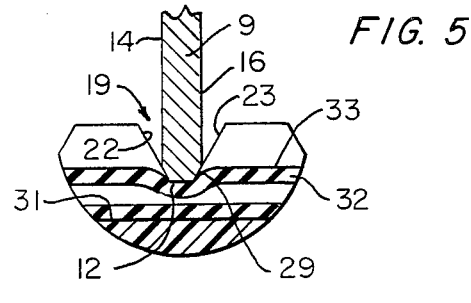
FIG. 6 is a fragmentary enlarged sectional view showing the relationship of the inner periphery of one of the disks with the arcuate support member on which it is supported and the means by which resilience is introduced into the union.

To firmly support a multiplicity of "hard" magnetic recording disks 9, each having an inner periphery 12, an outer periphery 13, and parallel sides 14 and 16, as shown in FIGS. 5, 6 and 6A, or any disk having inner and outer peripheries, on the support structure, the first and second elongated disk-support members 3 and 4 are provided with circularly arcuate surfaces 17 and 18, respectively, the radii of which are equal to the radius of the aperture in the disk. As seen in FIGS. 1 and 2, and in enlarged form in FIGS. 6 and 6A, the surfaces 17 and 18 are each provided with a multiplicity of circularly arcuate grooves 19 and 21, respectively. In each elongated member, the grooves are parallel to each other and are equally spaced along the longitudinal dimension of the member in which they are formed.

As illustrated in FIGS. 6 and 6A, the grooves are preferably V-shaped, each groove having sides 22 and 23 that subtend an angle of approximately 52°. It should be noted that both the surfaces 17 and 18 in which the grooves are formed are of equal radius, and that the grooves formed in these surfaces are also of the same radius, but the center of rotation for the grooves is offset a predetermined amount so that each of the grooves, in relation to the surface in which it is formed, is deeper at the medial point 24 of the arcuate member in which it is formed, and gradually and uniformly becomes more shallow as the groove approaches the side edges 26 and 27 on opposite sides of this medial point. This is the preferred relationship between each groove and the surface in which it is formed for the reason that when the mandrel is collapsed or contracted to its minimum diameter, the outer circularly arcuate surfaces 17 and 18 lie coaxially within a circumscribing circle defined by the inner periphery of the disk 9, thus permitting the mandrel to be easily slipped through the apertures of a multiplicity of axially aligned disks until each of the grooves comes into registry with the inner periphery of the circumscribing disks.

Now, with the mandrel in this position, actuation of the cam-actuating members results in the two elongated disk support members being displaced transversely of the central axis until the sides 22 and 23 of each groove engage the chamferred inner peripheral edges 28 and 29 of the associate disk 9 as illustrated in FIGS. 6 and 6A. It will of course be obvious to those skilled in this art that the disks may be formed with chamfers greater or less than 26°, that the grooves may be formed to conform to any angle of chamfer, and that even if a chamfer is not provided, the corners of the inner periphery of the disk will contact the sides of the groove so that the disk is held firmly on the support structure without possibility of movement in any direction. It should also be noted that it may be expedient to form each groove so that it possesses a flat circular surface conforming to the curvature and thickness of the inner periphery of the associated disk. While we have indicated a chamferred disk because that is the type that is most generally manufactured by "hard" magnetic recording disk manufacturers, it is not our intention to be limited to this specific configuration.

Referring to FIGS. 1, 2, 5 and 6, it will be seen that there is provided in the elongated disk support member 3 a longitudinally extending generally rectangular groove 31 that coincides with the medial points 24 of the grooves. Press-fitted within the elongated groove 31 is a resilient member 32 that extends the full length of the elongated member 3. The depth of the groove 31 and the thickness of the resilient member 32, which may be an elongated plastic body, are gauged so that the upper exposed surface 33 of the resilient member extends into each of the grooves a predetermined amount consistent with its resilient deformability upon the application of a compressive force by the inner periphery of the disk. Thus, the elongated resilient member 32 functions to resiliently cushion the inner periphery of each disk when the mandrel is expanded to enage the disks, and as long as the disks are retained on the support structure, exerts a radially outwardly resilient force on the inner peripheries of the disks, thus ensuring an immovable union between the support structure and the multiple disks supported thereby. It should be noted, however, that while the resiliently elastic body 32 functions as a cushion, it does not prevent the inner peripheral edges of the disks from physically contacting the sides 22 and 23 of the grooves as previously described. Also, while we have shown only one of the elongated members equipped with an elongated resiliently elastic body 32, it is of course obvious that the opposite elongated member may also be so equipped without departing from the spirit of the invention.

Figure 3:
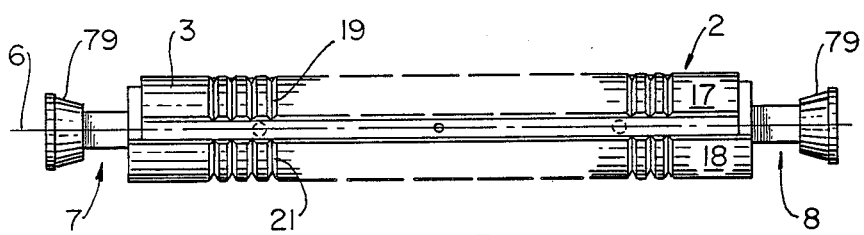
FIG. 3 is a side elevational view of the mandrel showing the disk engaging arcuate support members contracted to their mimimum diametric dimension.
Figure 4:
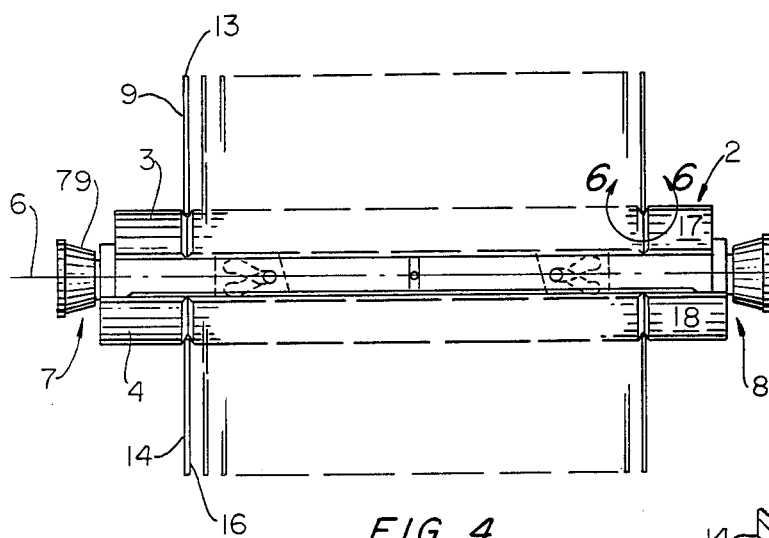
FIG. 4 is a side elevational view similar to FIG. 3, but showing the disk engaging arcuate support members expanded to engage the inner peripheries of multiple disks supported on the mandrel.

It will thus be seen by a comparison of FIGS. 3 and 4 that FIG. 3 illustrates the mandrel in collapsed or minimum diameter condition, while FIG. 4 illustrates the mandrel in expanded or maximum diameter condition. Referring to FIG. 3, it will be noted that the cam-actuating members 7 and 8 are extended left and right, respectively, while in FIG. 4, the cam-actuating members have been displaced inwardly, thereby shortening the overall linear dimension of the mandrel. Obviously, then, it is selective manipulation of the cam-actuating members 7 and 8 that effects expansion or collapse of the mandrel between its maximum and minimum diametrical limits.

Referring to FIGS. 7 through 19, it will be seen that the mechanism embodied in the cam-actuating members 7 and 8, which are identical, and the interconnection of this mechanism with the two diametrically opposed elongated support members 3 and 4, the surfaces 17 and 18 of which between side edges 26 and 27 subtend an arc of revolution less than 180°, is illustrated in assembled form, albeit in cross-section, in FIG. 7, the mandrel being shown in expanded condition in this view. As there shown, and also in FIGS. 12, 13 and 14, the elongated member 3 is formed with opposite end flanges 36 and 37, formed integrally with the associated ends of the elongated arcuate member, and each flange extending radially for a predetermined distance past the central axis and being provided with a centrally disposed slot 38 that bifurcates each of the flanges 36 and 37 for a portion of its length.

The elongated member 3 is provided with a circularly arcuate undersurface 39 (FIGS. 12 and 14), and with a pair of elongated, spaced and parallel flanges 41 and 42 that extend the full length of the elongated member and at opposite ends merge integrally with the end flanges 36 and 37 as shown. The elongated flanges 41 and 42 extend chordally from the undersurface 39 on opposite sides of the central axis, and extend away from the undersurface equal amounts closely approximating the length of the end flanges 36 and 37 to which their opposite ends are integrally united. The edges 43 and 44 of the elongated flanges 41 and 42 are coincident with a plane lying on the opposite side of the central axis from the undersurface of the elongated arcuate support member 3 as shown.

Referring again to FIGS. 12 and 14, it will be seen that each of the elongated flanges 41 and 42 are provided with two camming slots 46 and 47 adjacent opposite ends of the elongated flanges. It should be noted that the camming slots 46 in flanges 41 and 42 register with each other, but lie on opposite sides of the central axis, while the camming slots 47 in flanges 41 and 42 also register with each other and lie on opposite sides of the central axis. The camming slots 46 are each provided with a lower terminal portion 48 lying next adjacent the edges 43 and 44 of the flanges in which they are formed, an upper terminal portion 49 more remote from the edges 43 and 44 than the lower terminal portion 48, and an upwardly inclined camming portion 51 connecting the lower and upper terminal portions as shown. Note that the camming portions 51 of camming slots 46 are inclined upwardly and to the left as shown in FIG. 12. The camming slots 47 adjacent the other end of the flanges 41 and 42 are identical to the camming slots 46 with the exception that these camming slots are inclined upwardly and to the right as viewed in FIG. 12.

It is important to note, as illustrated in FIG. 19, that the terminal portions of each of the slots 46 and 47 are inclined slightly with respect to the horizontal as shown, the direction of inclination being opposite to the direction of inclination of the camming portion 51. We have found that an inclination of the terminal portions of approximately 3° from the horizontal is adequate for the purpose intended, which will hereinafter be explained. Suffice to say at this point that this inclination of the terminal portions 48 and 49 is utilized to lock the mandrel in either its extended (expanded) condition, or in its collapsed, minimum diameter condition.

Referring to FIGS. 9, 10 and 11, it will there be seen that the elongated support member 4 is provided with opposite end flanges 52 and 53, each integral with the associated arcuate end portion of the elongated arcuate support member, and extending radially from the undersurface 54 of the arcuate member to a predetermined point past the central axis of the support member. Whereas the end flanges on the elongated support member 3 are bifurcated as previously described, the flanges 52 and 53 are each provided with a rectangular aperture 54 the length of which is aligned with the long dimension of the flange in which it is formed. This construction is seen best in FIG. 10.

As with the elongated member 3, the arcuate limits of the elongated member 4 are defined by side edges 56 and 57 which, if extended radially inwardly, would intersect at the center of revolution of the arcuate surface 18. As shown in FIG. 10, the arcuate surface 18 subtends an angle less than 180°.

Projecting chordally from the arcuate undersurface 54 of the elongated support member 4 are two pairs 58 and 59 of cantilever-like flanges that are integral with the undersurface from which they project. The flanges of each pair, for instance the pair 58 which lie adjacent the end flange 52, and the pair 59 which are spaced longitudinally from the pair 58 and lie adjacent the opposite end flange 53, are spaced on opposite sides of the longitudinal central axis as seen in FIG. 11. Each of the flanges of the pairs of flanges 58 and 59 is provided with a distal end 61 remote from the undersurface 54 an amount approximating the length of the end flanges 52 and 53. The distal end 61 intercepts near vertical correspondingly positioned spaced edges 62 and 63 which define the width of the flanges measured in the direction of the longitudinally extending central axis as shown.

As illustrated in FIGS. 9 and 19, both of the flanges of each pair of flanges 58 and 59 are penetrated by transversely registering camming slots designated generally by the numerals 64 and 66 similar to the camming slots 46 and 47 formed in the flanges 41 and 42, but inclined in the opposite directions. Thus, with respect to the camming slots 64, each includes terminal portions 67 and 68 at different levels joined by a connecting intermediate camming portion 69 which, as illustrated in FIG. 9 is inclined upwardly and to the right. As with the terminal portions 48 and 49, the terminal portions 67 and 68 may be designated lower and upper terminal portions, respectively, and each of the terminal portions 67 and 68 is slightly inclined in relation to the horizontal and inclined in a direction opposite to the intermediate connecting comming portion 69. As before, we have found an inclination of about 3° to be adequate to lock the elongated support members at the diametric limits of their excursion.

It will be seen from a comparison of FIGS. 11 and 14 that the transverse dimension of the outside surfaces 71 and 72 of the pairs of flanges 58 and 59 are spaced aproximately equally to the width of the channel 73 defined by the inner surfaces 74 of the flanges 41 and 42. Actually, the spacing between the flange surfaces 74 is just large enough to permit the flange pairs 58 and 59 to slip transversely into and outwardly of the channel 73 when the two elongated arcuate support members are assembled as illustrated in FIG. 7. This relationship is illustrated in FIG. 8. So assembled, it will be seen that the camming slots 46 and 64 are inclined in opposite directions and the camming slots 46 overlie the camming slots 64 so that the terminal portions 48 and 68 of the two camming slots are in registry when the elongated support members 3 and 4 are in their expanded condition as illustrated in FIGS. 4 and 7, while when the elongated support members 3 and 4 are in their contracted or minimum diametric spacing as illustrated in FIG. 3, the terminal portions 49 and 67 of the two slots are in registry.

In like manner, referring to the camming slots 47 and 66 in the opposed elongated support members 3 and 4, when the members 3 and 4 are expanded to their maximum diametric limit as illustrated in FIGS. 4 and 7, the terminal portions 48 and 68 are in registry, while when the members 3 and 4 are contracted to their mimimum diametric dimension, the terminal portions 49 and 67 are in registry.

This reversal of positions of the camming slots 46/64 and 47/66 is brought about by the interposition of the cam actuating members 7 and 8 between the first and second elongated arcuate support members 3 and 4 as will now be explained. Referring to FIGS. 7, 7A, and 15 through 17, it will be seen that the cam actuating member 7 includes an elongated generally rectangular cross-section slide shaft 76 that slidably extends at the left end of the structure as illustrated in FIG. 7 through the rectangular aperture 54 in end flange 52 of elongated arcuate member 4 and through the elongated slot 38 formed in the end flange 36 of elongated arcuate member 3. The rectangular slide shaft 76 also passes slidably into the 73 from whose sides it is spaced so that it may slidably and guidably pass between the flange pair 58. Beyond the flange pair 58, the rectangular slide shaft 76 is cut away to provide a rack section 77 having a series of gear teeth 78 formed therein as shown and facing the central axis of the support structure. At its opposite end the slide shaft is provided with a knob 79 by which it may be manipulated either digitally or by robotics. Press-fitted into the slide shaft 76 is a cam pin 81 that projects from opposite sides of the slide shaft in cantilever portions 82 and 83 (FIG. 16). These cantilever cam pin portions project through the camming slots 46 and 64 as shown, the ends of the cam pin portions generally being flush with the outer surfaces of the flanges 41 and 42 of the elongated arcuate support member 3, and of a diameter to form a smooth slip fit within the camming slots.

In like manner, the cam actuating member 8 includes an identical slide shaft 84 similarly slidably journaled in the rectangular aperture 54 in end flange 53 of elongated member 4, and passing slidably through the slot 38 formed in the end flange 37 of the elogated member 3. However, the rack portion 86 of this slide shaft overlaps and faces the rack portion 77, and is provided with gear teeth 87 that register with the teeth 78 of the rack portion 77, so that both sets of gear teeth may be meshed with the teeth 88 of a pinion gear 89 journaled on a shaft 91. The journal shaft 91 rotatably supports the pinion gear 89, and the opposite ends of the shaft 91 are press-fitted into appropriate apertures 92 and 93 in the side walls 94 and 96 of a generally rectangular cross-section journal tube 97 which encloses the overlapped rack portions 77, the pinion gear 89, and provides a support for the shaft 91 press-fitted into the apertures 92 and 93. The slide shaft 84 is also provided with a transversely extending cam pin 98 similar to and for the same purpose as the cam pin 81 in slide shaft 76.

As illustrated in FIGS. 17 and 18, the journal tube 97 is conveniently formed from a channel member, preferably plastic, with the side 96 being attached to the channel member by means of a so-called "living hinge" so that when the support structure is assembled, the journal tube is assembled as a sub-assembly with the side 96 pivoted into a channel-closing position as indicated in dash lines in FIG. 18. The journal tube, with pinion gear caught rotatably on the shaft 91, is then fitted snugly into the channel 73 formed by the elongated flanges 41 and 42 of the elongated member 3, with the axis of the shaft 91 coincident with a transverse plane that passes through the median point of the elongated support structure as shown in FIG. 7. Next, the cam actuating members 7 and 8, prior to insertion of the cam pins 81 and 98, are inserted from opposite ends so that the rack portions 77 and 86 pass into the tubular support member 97 from opposite ends and on opposite sides of the toothed pinion gear 89 as shown. The cam actuating members are positioned within the support structure in relation to the camming slots so that the apertures in the cam actuating members 7 and 8 adapted to receive the cam pins are in registry with the camming slots 46/64 and 47/66 and the cam pins 81 and 98 are press-fitted into the slide shaft apertures provided for that purpose. As previously stated, the cam pins 81 and 98 are dimensioned to form a smooth slip fit within the camming slots.

It will thus be seen that by pulling outwardly on the knobs of the cam actuating members 7 and 8 from the position of the elongated arcuate support members in their expanded position as shown in FIG. 4, the cam pin 81 will move to the left in the camming slots 46 and 64, while the cam pin 98 will move to the right in camming slots 47 and 66. In so doing, the cam pins 81 and 98 are moved out of the reversely inclined terminal portions 48 and 68 where they have been locked by virtue of the reverse incline, and enter the slot portion forming the intermediate connection camming slots 51 and 69. Since the cam pins can only move in a straight line along the longitudinal axis of the support structure, it is clear that the cam pins therefore cause the upper member 3 to be drawn downwardly toward the central axis, and in like manner cause the lower member 4 to be raised toward the upper member 3 and toward the central axis, thus decreasing the diametrical distance between the arcuate surfaces 17 and 18 of the two opposed elongated support members. Since the toothed rack portions 77 and 86 are meshed with the pinion gear 89, which is prevented from being translated longitudinally by the snug fit between the flanges 41 and 42, and by closely abutting the near vertical edges of the adjacent flange pairs 58 and 59, outward movement of the cam actuating members results in rotation of the pinion gear and equal longitudinal displacement of the slide shafts in opposite directions. Consequently, the two cam pins 81 and 98 also move at equal rates but in opposite directions, and their movement at equal rates results in the elongated arcuate members 3 and 4 being displaced in opposite directions at equal rates. The same mode of operation, but in reverse, occurs when the cam actuating members are moved inwardly from the positions shown in FIG. 3 where the opposed elongated arcuate members are shown in contracted or collapsed condition.

It is important to note that when the elongated arcuate members 3 and 4 are in either their fully expanded or fully contracted conditions, the cam pins 81 and 98 lie within the corresponding terminal portions of the camming slots. Since the terminal portions of the camming slots are inclined in the opposite direction to the intermediate connecting portion, it will be seen that there is no natural tendency for the cam pins to slip up the incline into the intermediate connecting portion. Rather, the opposite tendency occurs. Thus, with the cam pins in the positions indicated in FIG. 7 and the mandrel expanded, any outside force tending to squeeze the two elongated arcuate members toward each other will result in the cam pins being driven tighter into the terminal portion and away from the intermediate connecting portion of the camming slots. In this manner it is assured that the disk support structure will not inadvertently be changed in its condition from one state to another. Such an outside force, for instance, is exerted by the resiliently elastic member 32 which, when compressed as when a multiplicity of "hard" magnetic recording disks are supported on the mandrel, reacts to provide an inwardly or collapsing force on the two elongated arcuate support members with the effect that the cam pins are even more securely retained in their terminal portion seats.

Referring to the assembly of the mandrel-type support structure described above with the two housing embodiments illustrated in FIGS. 20-24 and FIGS. 25-27, both housing embodiments are effective to ensure that the cam actuating members 7 and 8 cannot be displaced longitudinally in either direction when the mandrel is supported within the housing.

Referring first to FIGS. 20-24, it will be seen from FIG. 20 that the sub-assembly of the mandrel 2 loaded with a multiplicity of "hard" magnetic recording disks 9 is shown completely enclosed within a housing designated generally by the numeral 101. The housing 101 includes a lower base portion 102, and an upper cover portion 103. The lower base portion of the housing includes a bottom wall 104, end walls 106 and 107 and side walls 108 and 109, all integrally formed, preferably by injection molding, from an appropriate synthetic resinous material that is tough and resistant to impact shocks. As shown in FIGS. 23 and 24, the side walls 108 and 109 include outwardly and upwardly projecting side wall portions 112 and 113 that internally provide two series of grooves 114 spaced laterally of one another in correspondence with the side wall portions 112 and 113. As illustrated best in FIG. 24, the grooves 114 constitute short arcuate segments spaced above the bottom wall 104 sufficiently so that when the outer periphery 13 of a disk engages corresponding grooves in the two series of segmented grooves, the disk will be supported so that the bottom of the disk is clear of the bottom wall 104.

The lower base portion 102 is also provided at each opposite end with an upward extension 116 which at its bottom end merges integrally with the associated end wall 106 or 107, and from the side wall portions 112 and 113 projects inwardly in inclined top edges 117 and 118 which are intercepted by arcuate top edge 119 as shown. The arcuate top edges 119 form a seat or cradle for opposite ends of the mandrel, as shown in FIG. 20, with the top edge portions of the upward extensions 116 fitting snugly into the special generally square cross-section grooves 121 formed in the arcuate surface 18 of elongated member 4 as shown in FIGS. 7 and 9. As a consequence, when the mandrel is cradled in the arcuate seats 119 with the seats snugly engaged in the grooves 121, which are curved to conform to the curvature of the arcuate seats 119, the mandrel is held not only against longitudinal displacement in relation to the housing base, but is also retained against rotational displacement in relation to the base portion 102. It is important to note that when the mandrel loaded with disks is seated in the cradles 119, the mandrel is at its maximum expanded limit with the inner peripheries of the disks seated snugly in the grooves 19 and 21 of the first and second elongated members, and the cam actuating members at their innermost position as shown in FIG. 4, in which position the cam pins 81 and 98 are seated in their respective terminal end portions of the camming slots 46 and 64.

In this assembled form, placement of the cover 103 over the base 102 completely encloses the assembly of mandrel and disks as shown in FIG. 20. To accommodate the cover, and to ensure a tight seal between the cover and base, the base is provided around its open perimeter with an outwardly extending apron wall 122 that terminates in an upwardly extending seal flange 123 as shown in FIGS. 23 and 24.

The cover, on the other hand, as illustrated in FIGS. 21 and 22, is provided with a top wall 124, end walls 126 and 127, side walls 128 and 129, and peripheral flanges 131 and 132 adapted to cooperate with the seal flange 123 on the base to seal the interior cavity of the housing against the entrance of contaminating substances. The dimensions of the cover are such that when in final position on the base, the top peripheral edges of the disks sealed within the cavity do not physically contact the inner surfaces of the cover, thus again ensuring against contamination of the disks. The cover also cooperates with the base portion of the housing to ensure that the mandrel cannot escape its cradle support. To accomplish this effect, the cover is provided with end wall extensions 133 and 134 at opposite ends of the cover, these end wall extensions including arcuate wall portions 136 and 137, which are in turn closed by end wall portions 138 and 139. It will thus be seen that the arcuate wall portions 136 and 137 conform to the curvature of the surface 117 of the elongated support member 3 and closely enclose the associated end of the mandrel when the cover is in position. In like manner, the longitudinal dimension between the end wall portions 138 and 139 is gauged to closely confine the external portions (knobs) of the cam actuating members 7 and 8, thus cooperating with the reversely inclined terminal portions in which the cam pins are seated to prevent inadvertent displacement of the cam actuating members in a direction to cause contraction or collapse of the mandrel from its disk-supporting condition.

To lock the cover to the base, there is provided an integral clip 141 at each end, depending from the outer peripheral flange 132, and having a tapered end portion 142 that wedges against the seal flange 123 of the base portion, camming the clip 141 outwardly, until the shoulder 143 on the clip engages under the apron wall 122 to lock the cover securely to the base. The assembled housing with mandrel and disks enclosed can be supported in the orientation illustrated in FIGS. 20–24, or it can be supported on either one of its sides or even on its ends, without danger of dislodging the disk-laden mandrel from its support cradles. Additionaly, it should be noted that the disks do not come into physical contact with any part of the interior of the container or housing, thus precluding the possibility of particles resulting from abrasion contaminating the disks.

Referring to FIGS. 25–27, there is shown another embodiment of a housing, here designated generally by the numeral 144, and including a cylindrical wall 146 closed at one end by an end cap 147 which is molded from plastic as an integral part of the cylindrical wall 146, but which can also be removable in the same way as the opposite end cap 148. The end cap 147 is provided with an outwardly projecting boss 149 arranged coaxially with respect to the cylindrical wall 146, the boss being hollow within the cavity formed by the housing to provide a cylindrical recess 151 adapted to form a seat to receive and support the knob end of the cam actuating member 7 of the mandrel. To lend strength and rigidity to the end cap 147, radiating ribs 152 are provided extending between the boss 149 and a cylindrical flange 153 which constitutes a short extension of the cylindrical wall 146 as shown.

At its opposite end, the cylindrical wall 146 is open-ended so as to admit the insertion of the mandrel loaded with disks as shown, the knob of the cam actuating member being inserted into the recess 151 which is gauged in diameter to provide a snug slip fit with the knob. The other end of the mandrel is supported on a similar recess 154 formed in the end cap or cover 148 by a cylindrical support flange 156 coaxially arranged on the end cap 148 and extending into the cavity when the cap or cover is placed over the open end of the cylindrical housing. Note that the detachable end cap or cover 148 is retained on the cylindrical wall by cylindrical closure flange 157 that circumscribes the outer open end of the cylindrical wall 146.

As with the end cap 147, the cover or end cap 148 serves not only to close the open end of the cylindrical housing, but also to support the associated end of the mandrel 2 by snug engagement of the knob end of the cam actuating member within the recess 154. Thus assembled, it will be seen that the cam actuating members 7 and 8 are prevented from being extended by the end caps, while transverse displacement of the mandrel support assembly and disks is prevented by the snug reception of the cam actuating member knobs in the recesses 151 and 154. The detachable cap or end cover 148 may be sealed to the associated cylindrical wall by any convenient means such as pressure sensitive tape, or even adhesive.

So enclosed within the housing 144, or the housing 101 depicted in FIG. 20, it will be seen that the disks, regardless of the fragilness of the disks, or their susceptibility to contamination, are protected against impact shocks that might cause the disks to impact each other, and are protected from being contaminated by wear products from the disks themselves, and from atmospheric borne contaminants.

Additionally, the mandrel provides the opportunity for a multiplicity of fragile disks to be handled simultaneously for the many different purposes discussed above involving manufacture, coating, cleaning and polishing. In this regard, while we have disclosed a mandrel that will support disks spaced approximately $\frac{1}{4}''$ apart, it is clear that other spacings could be used, dictated by the necessity of the circumstances involved.

For instance, a given process may require that the disks be spaced at ½" or ¾" intervals to provide sufficient clearance on opposite sides of the disks to accomplish a given procedure. It is intended that these types of variations of the structure are contemplated by the invention.

Having thus described the invention, what is thought to be new and novel and sought to be protected by letters patent of the United States is as follows.

We claim:

1. An elongated support structure for supporting a multiplicity of centrally apertured disks in non-contiguous spaced parallel relationship along a longitudinal axis, comprising:
   (a) a first elongated disk-support member having a circularly arcuate surface;
   (b) a second elongated disk-support member having a circularly arcuate surface and arranged in diametrically spaced juxtaposed complementary relation to said first elongated member; and
   (c) means interconnecting said first and second elongated disk-support members and manipulable to vary the diametric spacing between the circularly arcuate surfaces of said first and second elongated disk-support members selectively between minimum and maximum predetermined limits whereby said first and second elongated disk-support members extend through the central apertures of said disks and engage the disks when manipulated to said maximum predetermined limit and release the disks when manipulated to said minimum predetermined limit.

2. The combination according to claim 1, in which at least one of said circularly arcuate surfaces of said first or second elongated disk-support member is provided with a series of longitudinally spaced parallel generally V-shaped circularly arcuate grooves formed therealong.

3. The combination according to claim 1, in which said circularly arcuate surfaces of said first and second elongated disk-support members are provided with a series of longitudinally spaced parallel generally V-shaped circularly arcuate grooves formed therealong, the grooves in said first elongated disk-support member in spaced registration with the complementary grooves in said second elongated disk-support member.

4. The combination according to claim 1, in which said means interconnecting said first and second elongated members includes laterally spaced longitudinally extending parallel flanges on each of said first and second elongated members, the flanges of one of said elongated members slidably engaging the flanges of the other elongated member.

5. The combination according to claim 1, in which said means interconnecting said first and second elongated members includes end flanges on said first and second elongated members extending transverse to the long dimension of said first and second elongated members, the end flanges of one of said elongated members slidably engaging the corresponding end flanges of the other elongated member to preclude longitudinal displacement of said first and second elongated members in relation to each other.

6. The combination according to claim 2, in which said V-shaped grooves formed in said circularly arcuate surface are formed by side walls subtending an angle of about 52°.

7. The combination according to claim 2, in which said V-shaped grooves formed in said circularly arcuate surface are spaced about 0.25".

8. The combination according to claim 2, in which each said V-shaped groove defines a circular arc having a center of revolution diametrically offset from the center of revolution of said circularly arcuate surface in which the V-shaped groove is formed.

9. The combination according to claim 2, in which each said V-shaped groove defines a circular arc having a center of revolution coincident with said longitudinal axis when said first and second elongated members are diametrically spaced apart at said maximum limit, and said center of revolution of said circular arcs defined by said grooves is offset from said longitudinal axis when said first and second elongated members are diametrically spaced apart at said minimum limit.

10. The combination according to claim 1, in which the circularly arcuate surfaces of said first and second elongated disk-support members define arcs of revolution having a common center of revolution coincident with said longitudinal axis when said first and second elongated members are diametrically spaced at said minimum limit.

11. The combination according to claim 1, in which the circularly arcuate surfaces of said first and second elongated members define arcs of revolution having centers of revolution offset from said longitudinal axis when said first and second elongated members are diametrically spaced at said maximum limit.

12. The combination according to claim 5, 6, 7, 8, 9, 10 or 11, in which said circularly arcuate surface of each said first and second elongated disk-support member is provided with a series of longitudinally spaced parallel generally V-shaped arcuate grooves formed therealong in spaced registration with the complementary arcuate grooves in the other elongated member.

13. The combination according to claim 4, in which the spaced parallel flanges associated with one of said first and second elongated members extend from one end to the other of the elongated member with which it is associated to form a channel opening toward the other diametrically spaced juxtaposed elongated member, and the spaced parallel flanges associated with the other elongated member comprise two pairs of flanges extending in transverse sliding relation into said channel formed by the flanges associated with said first mentioned elongated member whereby said first and second elongated members may be displaced diametrically to vary the spacing therebetween while being precluded from rotational displacement in relation to each other.

14. The combination according to claim 12, in which said circularly arcuate surface and the grooves formed therein are of equal radius with the centers of revolution of said circularly arcuate surface and said grooves being offset.

15. An elongated support structure for supporting a multiplicity of centrally apertured disks in non-contiguous spaced parallel relationship along a longitudinal axis, comprising:
   (a) a first elongated disk-support member having a circularly arcuate surface;
   (b) a second elongated disk-support member having a circularly arcuate surface and arranged in diametrically spaced juxtaposed complementary relation to said first elongated member; and
   means interconnecting said first and second elongated disk-support members and manipulable to vary the diametric spacing between the circularly arcuate surfaces of said first and second elongated disk-support members selectively between minimum and maximum predetermined limits;

(d) said means interconnecting said first and second elongated members including axially aligned longitudinally extending cam-actuating thrust members disposed between opposite end portions of said diametrically juxtaposed first and second elongated members, said thrust members being selectively displaceable longitudinally toward or away from each other to effect diametric displacement of said first and second elongated members and the circularly arcuate surfaces thereon.

16. The combination according to claim 15, in which said thrust members extend toward each other from opposite ends of said first and second elongated members and overlap for a portion of their lengths medianly of said first and second elongated members, and means cooperating with said overlapped portions of said thrust members operative to effect longitudinal axial displacement of one of said thrust members at the same rate but in the opposite direction when the other thrust member is axially displaced longitudinally of the first and second elongated members.

17. The combination according to claim 16, in which said means cooperating with said overlapped portions of said thrust members and operative to effect longitudinal displacement of one of said thrust members at the same rate but in the opposite direction of the other thrust member comprise series of opposed teeth formed on the overlapped portions of said thrust members, a rotatable toothed pinion engaging said series of opposed teeth on the overlapped portions of the thrust members, a sleeve slidably enveloping said overlapped portions of said thrust members, and a journal pin mounted on said sleeve and rotatably supporting said toothed pinion against axial displacement thereof upon axial displacement of said overlapped portions of said thrust members.

18. An elongated support structure for supporting a multiplicity of centrally apertured disks in non-contiguous spaced parallel relationship along a longitudinal axis, comprising:

(a) a first elongated disk-support member having a circularly arcuate surface;

(b) a second elongated disk-support member having a circularly arcuate surface and arranged in diametrically spaced juxtaposed complementary relation to said first elongated member; and (c) means interconnecting said first and second elongated disk-support members and manipulable to vary the diametric spacing between the circularly arcuate surfaces of said first and second elongated disk-support members selectively between minimum and maximum predetermined limits;

(d) said means interconnecting said diametrically juxtaposed first and second elongated members including longitudinally spaced pairs of cam surfacs mounted on said first and second elongated members, a pair of axially aligned cam actuating thrust members slidably disposed for longitudinal axial displacement between said spaced diametrically juxtaposed first and second elongated members, and force transmitting means on said thrust members slidably engaging said cam surfaces, whereby longitudinal axial displacement of said thrust members toward each other effects diametric displacement of said first and second elongated members in one direction and axial displacement of said thrust members away from each other effects diametric displacement of said first and second elongated members in the opposite direction.

19. The combination according to claim 18, in which means are provided associated with said pairs of cam surfaces for receiving and selectively retaining against inadvertent release said force transmitting means when said first and second elongated members reach said minimum or maximum limits of diametric displacement.

20. The combination according to claim 19, in which said means for receiving and selectively retaining said force transmitting means includes an extension surface of each said cam surface, each said extension surface intercepting the associated cam surface and forming a seat for said force transmitting means, each said extension surface being sloped in a direction whereby a diametrically imposed force imposed on said force transmitting means tends to retain the force transmitting means on said seat whereby an axially directed force imposed on said force transmitting means is required to dislodge said force transmitting means from said seat formed by said sloped extension surface.

21. An elongated support structure for supporting a multiplicity of centrally apertured disks in non-contiguous spaced parallel relationship along a longitudinal axis, comprising:

(a) a first elongated disk-support member having a circularly arcuate surface;

(b) a second elongated disk-support member having a circularly arcuate surface and arranged in diametrically spaced juxtaposed complementary relation to said first elongated member; and (c) means interconnecting said first and second elongated disk-support members and manipulable to vary the diametric spacing between the circularly arcuate surfaces of said first and second elongated disk-support members selectively between minimum and maximum predetermined limits;

(d) said means interconnecting said first and second elongated members including opposed elongated thrust members axially aligned along said longitudinal axis and slidably journaled at their remote ends on the associated ends of at least one of said first and second elongated members and at their inner associated ends having overlapping juxtaposed portions including spaced mutually opposing surfaces forming toothed racks, and a toothed pinion gear rotatably disposed between said toothed racks and having teeth meshing with the teeth on both said toothed racks whereby longitudinal displacement of one of said thrust members in relation to said first and second elongated members effects corresponding displacement at the same rate but in the opposite direction of the other thrust member in relation to said first and second elongated members.

22. The combination according to claim 21, in which means are provided stabilizing said overlapped juxtaposed portions of said thrust members against lateral displacement, and said toothed pinion is rotatably journaled on said stabilizing means.

23. An elongated support structure for supporting a multiplicity of centrally apertured disks in non-contiguous spaced parallel relationship along a longitudinal axis, comprising:

(a) a first elongated disk-support member having a circularly arcuate surface;

(b) a second elongated disk-support member having a circularly arcuate surface and arranged in diametrically spaced juxtaposed complementary relation to said first elongated member; and (c) means interconnecting said first and second elongated disk-support members and manipulable to vary the diametric spacing between the circularly arcuate surfaces of said first and second elongated disk-support members selectively between minimum and maximum predetermined limits;

(d) said means interconnecting said first and second elongated members including end flanges on said first and second elongated members extending transverse to the long dimension of said first and second elongated members, the end flanges of one of said elongated members slidably engaging the corresponding end flanges of the other elongated member to preclude longitudinal displacement of said first and second elongated members in relation to each other;

(e) the end flanges on one of said elongated members being provided with axially aligned apertures adapted to slidably receive said means manipulable to vary the diametric spacing of said first and second elongated members, and the end flanges of the other elongated member including bifurcated fingers adapted to slidably engage said means manipulable to vary the diametric spacing of said first and second elongated members.

24. The combination according to claim 23, in which said end flanges are generally rectangular, and said axially aligned apertures in the end flanges of said one of said elongated members is rectangular, having a length sufficient to accommodate transverse displacement of the end flanges in relation to said means manipulable to vary the diametric spacing of said first and second elongated members.

25. An elongated support structure for selectively supporting a multiplicity of centrally apertured disks in longitudinally spaced coaxial relationship along a longitudinal axis, comprising:

(a) a first elongated disk-support member laterally offset from said longitudinal axis and having a surface conformable to the periphery of said central apertures in said multiplicity of disks;

(b) a second elongated disk-support member laterally offset from said longitudinal axis on the opposite side thereof from said first elongated disk-support member and having a surface conformable to the periphery of said central apertures in said multiplicity of disks;

(c) means disposed between said first and second elongated disk-support members selectively manipulable to vary the lateral offset of at least one of said elongated disk-support members in relation to said longitudinal axis whereby to vary the relative diametric spacing of said first and second elongated disk-support members including said surfaces conformable to said central apertures between minimum and maximum limits; and (d) a multiplicity of centrally apertured disks circumscribing said first and second elongated disk-support members and disposed therealong in longitudinally spaced relation whereby said first and second elongated disk-support members engage said centrally apertured disks when spaced at said maximum relative diametric limit to retain said disks against relative longitudinal displacement relative to said elongated disk-support members and whereby said first and second elongated disk-support members disengage said disks to accommodate relative longitudinal displacement relative to said elongated disk-support members when said first and second elongated disk-support members are spaced at said minimum relative diameter limit.

26. The combination according to claim 25, in which both said elongated members are selectively displaceable laterally in relation to said longitudinal axis by manipulation of said means disposed between said first and second elongated members and manipulable to vary the lateral offset of said elongated members.

27. The combination according to claim 25, in which said means disposed between said first and second elongated members is manipulable to uniformly vary at the same rate the lateral offset of said first and second elongated members in relation to said longitudinal axis.

28. The combination according to claim 25, in which said surface on said first elongated member that is conformable to the periphery of said central apertures of said multiplicity of disks is provided with a series of longitudinally spaced parallel generally V-shaped circularly arcuate grooves, and the inner peripheral edge portions of said centrally apertured disks engage in said V-shaped grooves when said first and second elongated members are spaced at said maximum diametric limit, and said surfaces conformable to said inner periphery of said central apertures of said disks are diametrically spaced less than the diameter of said central apertures when said first and second elongated members are spaced at said minimum diametric limit.

29. The combination according to claim 25, in which said surfaces on said first and second elongated members that are conformable to the periphery of the central apertures of said multiplicity of disks are each provided with a series of longitudinally spaced parallel generally V-shaped circularly arcuate grooves, and the inner peripheral edge portions of said centrally apertured disks engage said V-shaped grooves when said first and second elongated members are spaced at said maximum diametric limit.

30. The combination according to claim 28, in which said V-shaped grooves are formed by side walls subtending an angle of about 52°, and the inner peripheries of said central apertures of said disks are chamfered to subtend an angle of about 52°, and the chamfered edges of said central apertures of said multiplicity of disks engage the side walls of said grooves when said first and second elongated members are spaced at said maximum diametric limit.

31. The combination according to claim 29, in which said V-shaped grooves are formed by side walls subtending a predetermined angle, and the inner peripheries of said central apertures of said disks are chamfered to correspond to said predetermined angle, and the chamfered edges of said central apertures of said multiplicity of disks engage said side walls of said grooves when said first and second elongated members are spaced at said maximum diametric limit, whereby said multiplicity of disks are supported in coaxial alignment and are retained against rotation and longitudinal displacement in relation to said first and second elongated members.

32. The combination according to claim 25, in which an elongated housing is provided enclosing said elongated support structure and said multiplicity of apertured disks supported thereon and including closure means to form a substantially sealed cavity within said housing, means within said housing for receiving and supporting said elongated support structure an disks so that said disks lie substantially sealed within said cavity when said closure means are applied to close said housing whereby said disks do not contact said housing when supported on said support structure within said housing cavity.

33. The combination according to claim 32, in which said elongated housing includes a base member and a detachable cover member sealingly engaging said base member.

34. The combination according to claim 32, in which means are provided within said housing cooperatively related to said elongated support structure to retain said support structure against longitudinal displacement relative to said housing.

35. The combination according to claim 32, in which means are provided within said housing cooperatively related to said elongated support structure to retain said elongated support structure against lateral displacement relative to the longitudinal dimension of said housing.

36. The combination according to claim 32, in which means are provided within said housing cooperatively related to said means manipulable to vary the diametric spacing of said first and second elongated members to retain said means against manipulation when said elongated support structure is enclosed within said housing whereby said first and second elongated members are retained at said maximum limit of their diametric spacing when said elongated support structure and disks are enclosed within said housing.

37. The combination according to claim 32, in which said housing is generally cylindrical and symmetrical about a longitudinal axis, and said elongated support structure is supported in said cylindrical housing in axial alignment therewith whereby the cylindrical wall of said housing lies radially spaced from the outer peripheries of said disks.

38. The combination according to claim 32, in which said longated housing includes a base member and a cover member defining a cavity within said housing when said cover member is applied to said base member and means on said base member and cover member cooperating to support said elongated support member and said disks within said cavity in a manner to prevent longitudinal and transverse displacement thereof relative to said base member.

39. The combination according to claim 32, in which said first and second elongated members are provided with slidably interengaging radially extending flanges which accommodate relative diametric displacement of said first and second members and lock said first and second elongated members against relative longitudinal displacement in relation to each other; and said closure means includes a cover member adapted to sealingly engage said base member and having at least one socket therein adapted to receive one pair of said slidably interengaging radially extending flanges on one end of said elongated support structure to retain said elongated support structure and said disks, immovable within said cavity within said housing.

40. The combination according to claim 33 in which a series of circularly arcuate grooves are formed in said base member adpated to receive and engage the outer peripheral edges of said disks when said means manipulable to vary the spacing of said first and second elongated members of said support structure are manipulated to vary the diametric spacing thereof to said minimum limit while said elongated support structure is supported on said base member and said cover member is detached from said base member.

41. The combination according to claim 40, in which selectively releasable lock means are provided on said housing for locking said base member and cover together in a cavity-forming assembly.

* * * * *